Aug. 9, 1960     W. L. CARLSON, JR., ET AL     2,948,118
ELECTROMAGNETIC PUMP ACTUATED DEVICE
Filed Feb. 28, 1955                                                        3 Sheets-Sheet 1
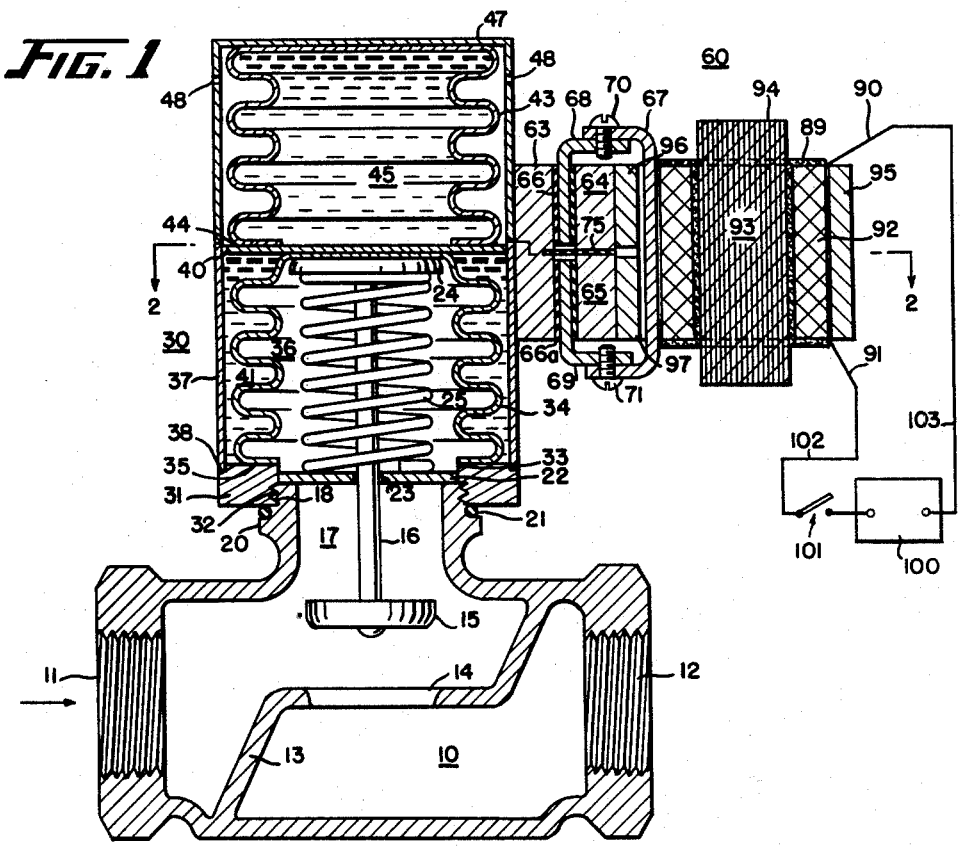
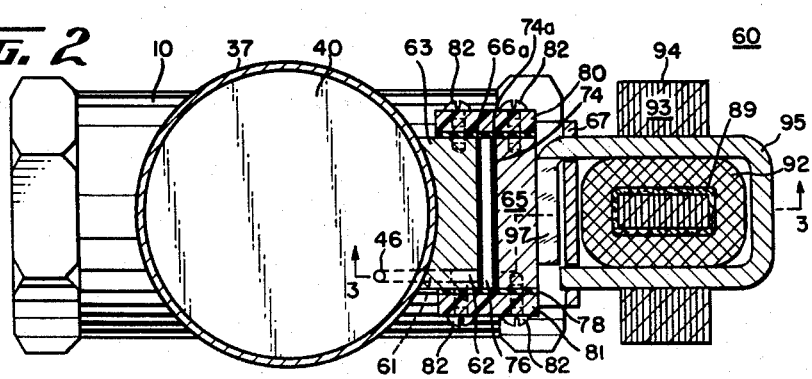
INVENTORS
WILLIAM L. CARLSON JR.
FRANK M. EXNER
BY Joseph E. Ryan
ATTORNEY

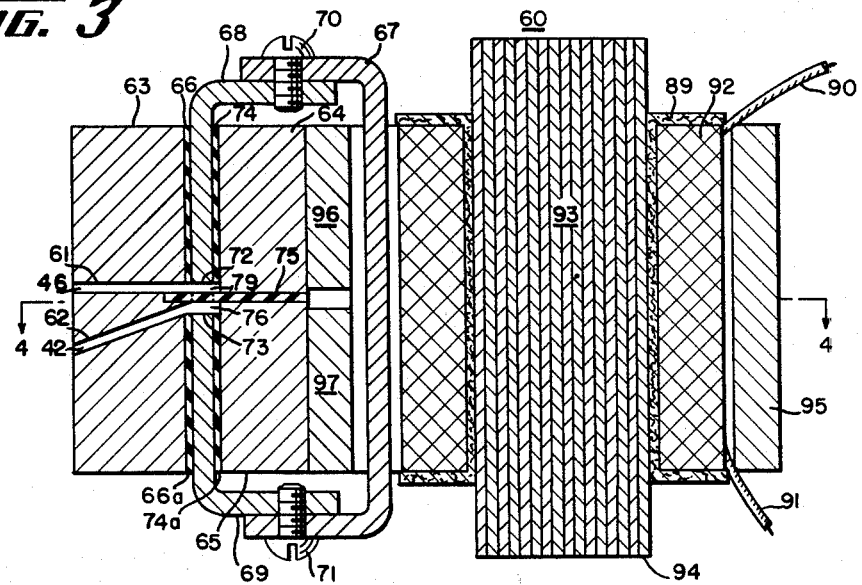
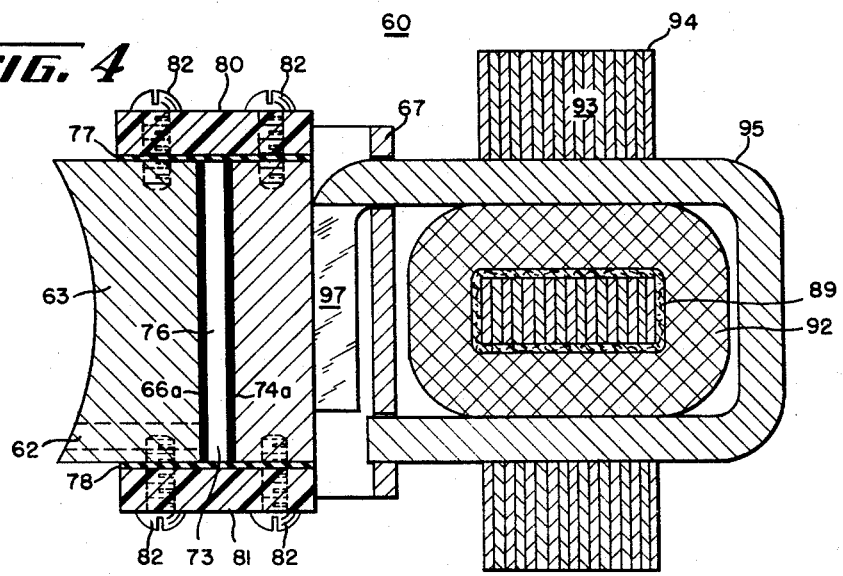

Aug. 9, 1960   W. L. CARLSON, JR., ET AL   2,948,118
ELECTROMAGNETIC PUMP ACTUATED DEVICE
Filed Feb. 28, 1955   3 Sheets-Sheet 3
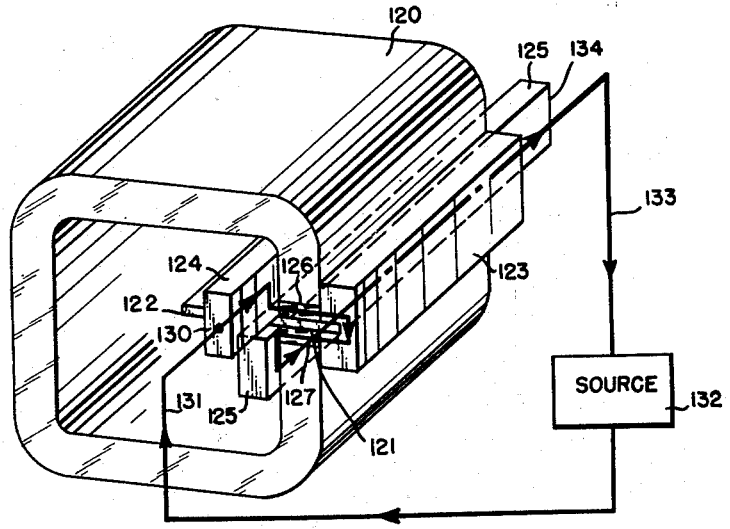
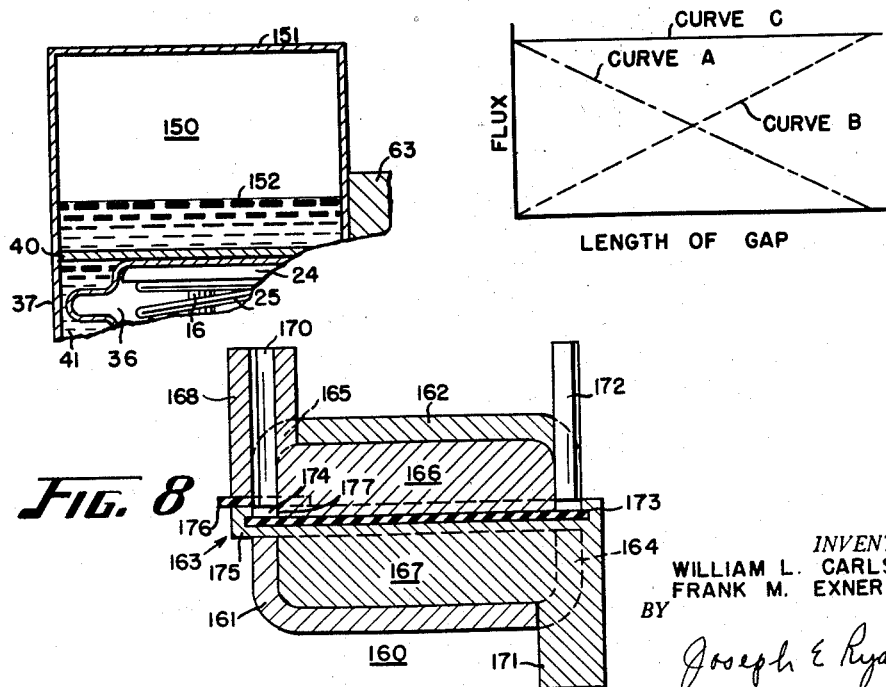
INVENTORS
WILLIAM L. CARLSON JR.
FRANK M. EXNER
BY
Joseph E. Ryan
ATTORNEY

United States Patent Office 2,948,118
Patented Aug. 9, 1960

2,948,118

ELECTROMAGNETIC PUMP ACTUATED DEVICE

William L. Carlson, Jr., and Frank M. Exner, Minneapolis, Minn., assignors to Minneapolis-Honeywell Regulator Company, Minneapolis, Minn., a corporation of Delaware Filed Feb. 28, 1955, Ser. No. 490,954

13 Claims. (Cl. 60—52)

This invention relates to the use of a conductive liquid metal pump in a mechanical actuating device and more specifically discloses a novel pump operating a liquid filled actuator for converting the pumping pressure into useful mechanical motion.

Electromagnetic conductive liquid metal pumps, or Faraday pumps as they are sometimes known, operate on a principle which very closely parallels any rotary motor. When a current passes through a conductor in a magnetic field, a field set up by the current within the conductor interacts with the existing field and the conductor is moved. In the case of the Faraday pump the liquid metal acts as the conductor and the pumping action results.

The improved device we disclose provides for a very small pump that is efficient and can be operated on a low-power input. The improved pump and actuator is small enough to be used as a control device in such locations as homes, schools, and commercial buildings, and the electrical input to the device is also low enough as not to exceed that of a more conventional form of control device. This pump can be used with any type of conductive liquid metal such as mercury, sodium or sodium-potassium alloys and the selection of the metal to be used can be made to suit the application of the device.

The novel pump develops relatively high pressure per unit of power input and therefore is capable of being used efficiently as a hydraulic actuator. This is not true of more conventional type pumps which are primarily flow devices and depend on water wheel and screw type actuators for development of useful work.

It is the primary object of this invention to provide a conductive liquid metal pump and actuator which is efficient and of very small size.

Another object of this invention is to provide a conductive liquid metal pump in which the self-induced magnetic field is fully utilized.

Still a further object of this invention is to provide an actuator which is completely silent in operation.

Yet another object of this invention is to provide an actuator which can be used as either a two position or modulating type of device.

These and other objects will become apparent upon reading the following specification when considered with the drawings hereinwith attached:

Figure 1 is a cross section of the novel conductive liquid metal pump and actuator when combined with a conventional valve;

Figure 2 is a cross section along line 2—2 of Figure 1;

Figure 3 is an enlarged cross section of the conductive liquid metal pump alone along lines 3—3 of Figure 2;

Figure 4 is a cross section of the enlarged conductive liquid metal pump shown in Figure 3 and is taken along lines 4—4;

Figure 5 is a schematic view of the novel liquid metal pump structure and discloses the current path through the device;

Figure 6 is a graph disclosing the addition of the two component fluxes in the conductive liquid metal pump gap;

Figure 7 discloses a modification of one of the liquid chambers in the actuator disclosed in Figure 1;

Figure 8 discloses a second conductive liquid metal pump utilizing the principles of operation set forth in connection with Figure 5.

Throughout the description of this novel device similar numbers will identify identical parts in all of the figures. In the drawings a valve is generally disclosed at 10. The valve 10 is of a conventional design and has an inlet 11 and an outlet 12. The inlet 11 and outlet 12 are separated by a barrier member 13 which has an opening or valve seat 14. The flow of a fluid from inlet 11 through valve seat 14 and outlet 12 is operatively controlled by a valve member 15. The valve member 15 is connected to a valve stem 16 by any convenient method, such as staking, and extends into the conductive liquid metal actuator generally shown at 30. The valve 10 contains a third opening, shown generally at 17, which is coaxial with the valve stem 16. The opening 17 at its outer edge contains threads 18 and a flange 20. Fitted over the threads 18 and tight against the flange 20 is a soft O-ring 21 which acts to seal the valve 10 against the bottom of the actuator 30. A centering washer 22 almost completely closes opening 17 except for a small hole 23 which acts to center the valve stem 16. At the top of the valve stem 16 there is staked a spring retainer plate 24 which confines a compression spring 25 between itself and the centering washer 22.

The conductive liquid metal actuator 30 is generally cylindrical in shape and contains a heavy metal base ring 31 at its lower end. This base ring 31 has internal threads 32 which mate with threads 18 of the valve body 10. Actuator ring 31 also contains a hole 33 which confines the centering washer 22 so that the valve stem 16 is properly aligned with the center of the conductive liquid actuator 30. Attached to the base ring 31 is a bellows 34. These two members are joined at 35 by any convenient manner, such as a weld. This arrangement forms a chamber 36 which is in communication with the inlet 11 of the valve 10 through the leakage around the valve stem 16 where the valve stem 16 passes through the centering washer 22. It can be seen that since the chamber 36 is sealed at 35, that the valve stem 16 is free to operate without the need of any tight, restraining packings at hole 23.

The actuator 30 is further constructed of a cylindrical metal member 37 which is joined to the base ring 31 at 38 by any manner such as welding or soldering. The member 37 is also sealed by a circular metal plate 40 which is welded or soldered around the circumference of member 37. It will be noted that plate 40, cylindrical member 37, base ring 31 and bellows 34 form a sealed chamber 41. Chamber 41 communicates with the conductive liquid metal pump generally shown at 60 through a small feeder channel 42 and channel 62 (best seen in Figure 3).

The upper portion of actuator 30 is formed by attaching a bellows 43 to the top of plate 40 at point 44 by a soldered or welded joint. Bellows 43 then forms with plate 40 a sealed chamber 45 above the plate 40. This chamber is connected through a feeder channel 46 (best shown in Figure 2) to a channel 61 of the conductive liquid metal pump 60. To protect the bellows 43 from damage a cover 47 is placed over the bellows and is attached to the top of member 37 by any convenient method. The bellows 43 is exposed to the atmosphere by means of holes 48.

It will be seen that when a conductive liquid metal fills chambers 45 and 41 and is removed from chamber 45 through the feeder channel 46 and pumped by the conductive liquid metal pump 60 into the chamber 41 through feeder channel 42 that the bellows 34 will be collapsed by the pumping pressure. Bellows 43 will in turn be collapsed by the atmospheric pressure entering through holes 48. The effect of pumping the conductive liquid metal into chamber 41 through the feeder channel 42 and collapsing the bellows 34 is to force the spring retainer member 24 downward. This action compresses spring 25 and causes the valve stem 16 to move downward and seats the valve member 15 against the valve seat 14. The reverse action of this operation can be obtained merely by ceasing the pumping action, as by de-energizing the pump 60, and allowing the spring 25 to expand to force the spring retainer member 24 to the plate 40 thereby forcing the liquid metal from chamber 41 to chamber 45. This will become apparent from the subsequent detailed description of the pump 60. By the selection of the proper type of valve 10, it is possible to have the spring 25 return the valve 10 to a safe position upon power failure. In the presently disclosed valve 10, the safe position would be the open position as shown in Figure 1. The unsafe position would be the closed position. The valve 10 could be a valve in a hot water heating system in which it is desirable to have open conditions to heat a building in case of a malfunction of the actuator or in case of a power failure. Furthermore, the control of fluid passing through the inlet opening 11, valve seat 14, and the outlet 12 can be of a complete on or off nature, can be modulated by periodically turning the pump on and off, or by modulating the power supplied to the pump.

The conductive liquid metal pump 60 is mounted on the side of the actuator 30 by any convenient method so that the pump electrode 63 which contains the feeder channels 61 and 62 are in alignment with the corresponding feeder channels 42 and 46 in the actuator 30. The pump 60 (as best shown in Figures 3 and 4) further consists of insulating barriers 66 and 66a which separates electrode 63 from a magnetic structure which is composed of a U-shaped member 67 and two L-shaped members 68 and 69. The magnetic members 67, 68 and 69 are held together by two screws 70 and 71 to form a C-shaped magnetic circuit. The faces 72 and 73 of the magnetic structures 68 and 69 are in alignment with the outer edges of feeder channels 61 and 62. The magnetic members 68 and 69 are in turn joined to additional insulating members 74 and 74a and are backed by two electrodes 64 and 65. The insulating members 66, 66a, 74 and 74a may be of any convenient insulating material such as varnish or a heat bonding insulation. A third insulating member or barrier 75 separates electrodes 64 and 65 and passes through the gap formed by magnetic face members 72 and 73. Insulating barrier 75 is embedded in electrode 63 between the feeder inlets 61 and 62. With the insulating barrier 75 in place the gap between magnetic face members 72 and 73 is formed into an upper rectangular channel 79 and lower rectangular channel 76 (Figure 4). Both ends of the channels 76 and 79 are sealed by insulating members 77 and 78 and are held in place by plates 80 and 81 by means of screws 82.

It will be noted from Figures 2 and 4 that the feeder channels 61 and 62 are placed over one another and close to one end of the electrode 63. It will be further noted that the insulation member 75 has an opening connecting channels 76 and 79 at the end remote from the feeder channels 61 and 62, and that a continuous channel is formed from feeder channel 61 into the channel 79 above insulator 75, to the end remote from the feeder channels, through the interconnecting opening in insulator 75, into the channel 76 below the insulating member 75 and back to feeder channel 62. It is therefore obvious that when the pump is connected to the actuator 30 that the liquid flow from the liquid chamber 41 of the actuator is through the interconnecting feeder channel 62, through the channel 76, back up through the end of insulator 75, returning in channel 79 above insulator 75 to feeder channel 61 and hence into the liquid reserve area 45 of the actuator 30.

The conductive liquid metal pump 60 is energized through leads 90 and 91. This energization is supplied to a coil 92 which is wound on insulating bobbin 89 and forms the primary of a transformer generally shown at 93. This transformer contains a laminated structure 94 of a conventional "figure 8" design, such as an E and I stacking or a split F. The secondary of the transformer 93 is a single turn of copper bar 95. This single turn arrangement forms a complete secondary loop and has the open ends 96 and 97 which are attached to electrodes 64 and 65 respectively. It will be obvious that in an arrangement of this type that the voltage output of the transformer 93 is exceedingly low but that the current available from the transformer would be very large. The secondary 95 may be insulated from the other parts by air or insulating materials not shown. In the present design the transformer while operating on 115 volts input has an output of approximately $\frac{1}{20}$ of one volt and supplies approximately 250 amperes. Since the ends 96 and 97 of the turn 95 are connected directly to the electrodes 64 and 65 it can be seen that upon placing a conductive material in channels 76 and 79 that current will flow in the secondary of the transformer 93. The current path of this novel electromagnetic liquid metal pump will be explained in more detail below. Energization of this pump is supplied by a current source 100 through leads 102 and 103 and is controlled by a series connected switch 101. It is understood that switch 101 could be replaced by any type of convenient control device either of a off-on nature or one which modulates the power output of power source 100. It is further understood that the transformer 93, the power source 100, leads 102 and 103 and switch 101 could be replaced by a direct current source of suitable voltage and current capacities and would be connected directly to electrodes 64 and 65.

The operation of the novel electromagnetic conductive liquid metal pump can best be understood by referring to Figure 5. This figure is schematic in nature and discloses a C-shaped insulated magnetic structure 120. In the opening 121 of this structure there is placed an insulating member 122. Closing one side of the opening 121 in the magnetic structure 120 is an electrode 123. Embedded in this structure 123 is one end of the insulating member 122. On the inside of the magnetic structure 120 are two electrodes 124 and 125. Electrode 124 is placed above the insulating member 122 and electrode 125 is placed below the insulating member 122. It will be seen that with this arrangement the C-shaped insulated magnetic structure 120 in combination with the electrodes 123, 124, 125, and barrier 122 form an upper passage or gap 126 and a lower passage or gap 127. Connected to electrode 124 at its end 130 is a conductor 131 which leads to a source of power 132. This source of power returns through conductor 133 to the far end 134 of electrode 125. It is therefore seen that if channels 126 and 127 are filled with a conductive liquid metal that current will flow from the power source 132 through conductor 131 to the end of electrode 130 and will distribute itself in some manner along the electrode 124. The current will then flow across the upper gap 126 by means of the conductive liquid metal into the electrode 123, back through gap 127 and the conductive liquid metal into the bottom electrode 125. The current will then flow or be distributed in electrode 125 and leave it at end 134 through conductor 133 and return to the source 132.

It is a well known fact that when current flows in a conductor a magnetic field is established about that conductor. Since there is a complete current path disclosed in the schematic arrangement of Figure 5 it is therefore evident that a magnetic field is established by this current flow. The current flowing into the top electrode 124 and flowing across gap 126 to electrode 123 creates magnetic flux linkages in the magnetic structure 120, but due to the fact that current is flowing in at one end of the device the flux distribution will not be linear in the magnetic structure 120. The flux linkages tend to concentrate at the input end and can be represented by curve A shown in Figure 6. In reality this curve is not a straight line but approaches it closely enough so that the representation shown in Figure 6 will provide a justifiably usable representation. If the current flowing in the upper gap 126 were the only current flowing it will be seen that the magnetic structure 120 would tend to be saturated at the high flux linkage end, or the end where the current input to electrode 124 is made at end 130. In order to obtain an efficient operation of the device of this nature an exceedingly large magnetic structure 120 would be required. If, however, the current is fed back completely linking the magnetic structure, as disclosed in this novel device, a second component of flux is obtained. The current flowing from electrode 123 through gap 127 into electrode 125 and out through the end of electrode 125 at 134 creates a flux linkage component concentration which can be represented by curve B in Figure 6. It will be seen that when these two curves are combined that a uniform flux distribution occurs in the magnetic structure 120 as represented by curve C. This arrangement provides for a full utilization of the self-generated magnetic flux of the current flowing in the gap of an electromagnetic liquid metal pump. In prior art devices the self-generated flux in the magnetic structure has generally been ignored and overridden by the addition of a separate exciting winding. In some cases this flux has been considered of such a disturbing nature that attempts have been made to cancel it completely before the addition of a second energization for the magnetic structure was attempted. It should be further pointed out that in this device no additional energization is required.

In Figure 7 we have disclosed a slightly modified arrangement of the actuator 30. This arrangement contains the same components below the separating plate 40 as in the actuator disclosed in Figure 1. The only difference between these two devices is the replacement of bellows 43 by a completely sealed chamber 150. In this case the cover member 151 is completely sealed to the separating member 40 and the conductive liquid metal 152 is added to displace approximately one-fourth of the total volume of the sealed chamber 150. In operation the liquid 152 is removed from chamber 150 creating a slight vacuum under the cover member 151. The remaining functions of the actuator and pump are identical to those disclosed previously in this application.

The principles of operation set out in Figure 5 can be applied to numerous physical arrangements. One such arrangement is disclosed in Figure 8. In this disclosure only the pump, shown generally at 160, is shown and it is understood that this pump could replace the pump 60 of Figure 1. Pump 160 is formed by placing two insulated, cup-shaped magnetic structures 161 and 162 together to form an annular gap generally shown at 163. The magnetic structures 161 and 162 have cut from them openings 164 and 165. Inside of structures 161 and 162 are placed two electrodes of copper or other conductive material 166 and 167. Electrode 166 has an extension 168 which fills opening 165 and passes outside the magnetic structure 162. The extension 168 further has an inlet 170 which passes down through the extension 168 and connects to the top of the annular gap 163. Diametrically opposite extension 168 is an extension 171 to electrode 167. This extension however is solid. An outlet 172 formed of a tube passes down through the magnetic structure 162 directly above extension 171 and connects to the top of the gap 163.

Electrodes 166 and 167 are separated by an insulating barrier 173. This barrier divides the gap 163 into a top liquid conducting channel 174 and a bottom ring of metal 175 which in reality is part of electrode 167. It should be understood that ring 175 could be replaced by another liquid metal channel, but is not shown as such for simplicity's sake. This change would also require other slight modifications such as placing outlet 172 in extension 171 of electrode 167. By proper forming of ring 175 of electrode 167 the ring 175 constitutes the outside wall of gap 174. An insulating member 176 is placed between electrodes 166 and 167 at the opening 165 in the structure 162. It is further noted that electrode 166 forms the inside wall of gap 174 as at 177. The pump 160 thus is formed to have an inlet 170, two parallel channels 174 (one-half the channel going each clockwise and counter clockwise) and a joint outlet 172. Any means (not shown) can be used to clamp the pump together.

When a current source is connected between electrode extensions 168 and 171 a current flows into the top electrode 166 and distributes itself equally around the inside gap wall 177 of electrode 166. The current then passes through the gap to ring 175, back into electrode 167 and out extension 171 to the source. At each point along the liquid metal gap 174 there is a current flow out of the magnetic structure and then back into the structure at exactly the same location. These current flows establish two component flux fields in structures 161 and 162 and can again be represented by curves A and B and the resultant C from Figure 6. As again can be seen the flux used to create the pumping action is supplied by the current causing the pumping and requires no additional coils or flux sources as are used in all other types of conductive liquid metal pumps.

In considering this invention it should be kept in mind that the present disclosure is intended to be illustrative only and the scope of the invention is to be determined only by the appended claims.

We claim as our invention:

1. In a device of the class described, in combination, an actuator including first and second chambers containing a conductive liquid and at least one of said chambers being variable in volume, a conductive liquid pump including two cup shaped insulated magnetic structures having an annular gap therebetween, first and second electrodes substantially filling said magnetic structures and extending through said structures at opposite locations and said electrodes including an inlet and outlet, the first said electrode being larger than said second electrode and encircling the second electrode to form sides for said annular gap, an insulating barrier separating said electrodes except at their peripheries, a current means connected to said electrodes and current from said means linking said magnetic structure to provide a pumping pressure, said inlet and outlet connected to said first and second chambers and said variable volume chamber providing motion responsive to said pumping pressure.

2. In a device of the class described, in combination, a conductive liquid filled actuator comprising a cylindrical chamber including upper and lower sections, said upper section having a first feeder channel and forming a liquid reservoir, said lower section having a second feeder channel and including a bellows sealed lower end; an electromagnetic conductive liquid pump comprising an electrical transformer having primary and secondary windings, first and second electrodes connected to said secondary winding and an insulating barrier separating said electrodes, an insulated C-shaped magnetic structure defining a gap and with said barrier passing through said gap, a third electrode supported across the gap and in turn supporting said insulating barrier to form upper and lower channels in said gap, means to seal the ends of said channels to form a single series channel and said series channel connected to said first and second feeder channels; said transformer secondary providing a current which links the magnetic structure after passing from the first electrode through the liquid in the upper channel and returning through the third electrode, the liquid in the lower channel, and the second electrode to create a pumping pressure and said pumping pressure being utilized to move said bellows.

3. A conductive liquid pump including two cup shaped insulated magnetic structures having an annular gap therebetween, first and second electrodes substantially filling said magnetic structures and extending through said structures at opposite locations and said electrodes including an inlet and outlet, the first said electrode being larger than said second electrode and encircling the second electrode to form sides for said annular gap, an insulating barrier separating said electrodes except at their peripheries, a current means connected to said electrodes and current from said means linking said magnetic structure to provide a pumping pressure.

4. An electromagnetic conductive liquid pump comprising an electrical transformer having primary and secondary windings, first and second electrodes connected to said secondary winding and an insulating barrier separating said electrodes, an insulated C-shaped magnetic structure defining a gap and with said insulating barrier passing through said gap, a third electrode supported across the gap and in turn supporting said insulating barrier to form upper and lower channels, means to seal the ends of said channels to form a single series channel and said series channel connected to said first and second feeder channels; said transformer secondary providing a current which links the magnetic structure after passing from the first electrode through the liquid in the upper channel and returning through the third electrode, the liquid in the lower channel, and the second electrode to create a pumping pressure.

5. In a device of the class described, in combination, an actuator including first and second chambers containing a conductive liquid metal and at least one of said chambers being variable in volume; an electromagnetic conductive liquid pump comprising an electrical transformer having primary and secondary windings, first and second electrodes connected to said secondary windings and an insulating barrier separating said electrodes, an insulated C-shaped magnetic structure defining a gap and with said insulating barrier passing through said gap, a third electrode supported across the gap and in turn supporting said insulating barrier to form upper and lower channels, means to seal the ends of said channels to form a single series channel and said series channel connected to said first and second feeder channels; said transformer secondary providing a current which links the magnetic structure after passing from the first electrode through the liquid in the upper channel and returning through the third electrode, the liquid in the lower channel, and the second electrode to create a pumping pressure; said pumping pressure varying the variable volume chamber to provide motion.

6. An electromagnetic conductive fluid pump having a magnetic structure partially defining at least one gap and said gap including an inlet and outlet; a plurality of electrode means partially forming the sides of said gap; said gap being filled with a conductive fluid; said electrode means defining a forward current path originating within said gap and a reverse current path originating outside said gap; and a source of electric current connected to first electrode means within said magnetic structure to pass said current through said fluid to second electrode means; said current passing back across said gap through said second electrode means and linking said magnetic structure to pump said fluid.

7. In an electromagnetic conductive fluid pump: a series flux circuit including conductive fluid channel means having a conductive fluid flowing therein; electrode means partially forming said channel means; said electrode means defining a forward current path originating within said flux circuit and a reverse current path originating outside said flux circuit; and a source of electric current connected to said electrode means to pass a current across said circuit in the fluid and said current then returning across the circuit; said current generating and linking a flux in the circuit to establish a pumping pressure in said fluid.

8. In apparatus of the class described, an actuator movable from a starting position to another position, said actuator including a plurality of mechanically independent chambers variable in volume, one said chamber being a reservoir and the other an operating chamber, said actuator having a passage connecting said chambers, a conductive fluid completely filling said chambers and said passage such that voids are not present therein, said operating chamber being normally in its minimum volume condition with said actuator in its starting position, means biasing said actuator to a safe position, said actuator being connected to a device to be actuated from a biased safe position to an unsafe position, an electromagnetic conductive fluid pump including a continuous conduit forming a part of said passage between said chambers, said fluid pump providing a pumping pressure on said fluid causing it to flow through the said passage from said reservoir to said operating chamber, electrical means included in said fluid pump for simultaneously causing an electric current path through said conductive fluid in said conduit part of said passage and for subjecting said conductive fluid in said conduit part to a magnetic field so as to create a motor effect to propel said fluid through said passage from said reservoir to the operating chamber of said actuator and moving said device to said unsafe position as said actuator moves to said other position, said actuator upon de-energization of said electrical means of said fluid pump returning with said device to said starting position to force said fluid from said operating chamber to said reservoir chamber by said device returning to its biased safe position.

9. In apparatus of the class described, an actuator therefor including first and second mechanically independent chambers containing a conductive fluid, bias means urging said actuator to a first position, at least one of said chambers being variable in volume, said actuator being movable from said first position and returnable to said position by said bias means, and an electromagnetic conductive fluid pump having a first port connected to one of said chambers and a second port connected to the other of said chambers, said fluid pump having a continuous passage therethrough and electrical means for simultaneously causing an electrical current to pass through said conductive fluid in said passage and for subjecting said conductive fluid to a magnetic field so as to create a motor effect to propel said fluid through said passage, said pump being effective when said electrical means is energized to cause the volume of the variable chamber to be altered so as to cause movement of said actuator from said first position, said actuator being returned to said first position by said bias means upon de-energization of said pump.

10. In apparatus of the class described, an actuator including first and second mechanically independent chambers containing a conductive fluid, at least one of said chambers being variable in volume, said actuator being movable from a first position, and an electromagnetic conductive fluid pump having a first port connected to one of said chambers and a second port connected to the other of said chambers, said fluid pump having a continuous passage therethrough and electrical means for simultaneously causing an electrical current to pass through said conductive fluid in said passage and for subjecting said conductive fluid to a magnetic field so as to create a motor effect to propel said fluid through said passage in one direction, said pump being effective when said electrical means is energized to cause the volume of the variable chamber to be altered so as to cause movement of said actuator from said first position, and means effective upon de-energization of said electrical means to cause the fluid to flow in the opposite direction between said chambers through said continuous passage of said pump to in turn cause said actuator to return to said first position.

11. In apparatus of the class described, a device movable from a starting position, an actuator therefor operatively connected to said device and including mechanically independent reservoir and operating chambers, said chambers containing a conductive fluid and said chambers further being variable in volume in response to the quantity of said fluid contained, said operating chamber having its minimum volume with the device in its starting position, biasing means for said device to hold it in said starting position, and an electromagnetic conductive fluid pump having connections with said chambers, said pump having a continuous passage therethrough and electrical means for simultaneously causing an electrical current to pass through said conductive fluid in said passage and for subjecting said conductive fluid to a magnetic field so as to create a motor effect to propel said fluid through said passage, said pump being effective when said electrical means is energized to cause the fluid to move from the reservoir to the operating chamber against said biasing means.

12. In a device of the class described: an actuator including first and second chambers containing a conductive liquid and at least one of said chambers being variable in volume and being always filled with said liquid; said actuator having a first position and a second position; bias means urging said actuator to said first position; and an electromagnetic conductive liquid pump having a continuously open channel providing a pumping pressure and having an inlet connected to said first chamber and an outlet connected to said second chamber; said pumping pressure varying the variable volume chamber to move said actuator to said second position; said bias means returning said actuator to said first position upon loss of said pumping pressure by causing said liquid to return through said channel in an unimpeded manner.

13. In a device of the class described: an actuator including first and second chambers containing a conductive fluid and at least one of said chambers being variable in volume and being always filled with said fluid; said actuator having an unbiased position and having yieldable means urging said actuator to a biased position; and an electromagnetic conductive fluid pump providing a pumping pressure and having an inlet connected to said first chamber and an outlet connected to said second chamber; said pumping pressure varying the variable volume chamber to move said actuator to said unbiased position; said yieldable means returning said actuator to said biased position upon loss of said pumping pressure.

References Cited in the file of this patent

UNITED STATES PATENTS

| | | |
|---|---|---|
| 853,789 | Holden | May 14, 1907 |
| 1,792,449 | Spencer | Feb. 10, 1931 |
| 1,804,212 | De Giers | May 5, 1931 |
| 2,386,369 | Thompson | Oct. 9, 1945 |
| 2,608,205 | Proctor | Aug. 26, 1952 |
| 2,612,109 | Wakefield | Sept. 30, 1952 |
| 2,635,637 | Karrer | Apr. 21, 1953 |
| 2,651,258 | Pierce | Sept. 8, 1953 |
| 2,652,778 | Crever | Sept. 22, 1953 |
| 2,669,183 | Godbold | Feb. 16, 1954 |
| 2,686,474 | Pulley | Aug. 17, 1954 |
| 2,715,190 | Brill | Aug. 9, 1955 |
| 2,741,984 | Lindenblad | Apr. 17, 1956 |

FOREIGN PATENTS

| | | |
|---|---|---|
| 126,947 | Great Britain | Dec. 24, 1919 |
| 698,623 | Great Britain | Oct. 21, 1953 |